United States Patent Office 3,748,290
Patented July 24, 1973

3,748,290
PLASTER MOLD COMPOSITIONS
Werner Reingen, Pfaffenberg, Germany, assignor to Suddeutsche Kalkstickstoffwerke Aktiengesellschaft, Trostberg, Upper Bavaria, and H & E Borgordts, fractional part interest to each
No Drawing. Continuation-in-part of application Ser. No. 869,887, Oct. 27, 1969. This appplication Feb. 28, 1972, Ser. No. 230,094
Claims priority, application Germany, Oct. 25, 1968, P 18 05 126.8
Int. Cl. C08g 37/30
U.S. Cl. 260—2.5 F                                13 Claims

ABSTRACT OF THE DISCLOSURE

A composition for the manufacture of patterns and molds, particularly ceramic molds comprising two principal constituents:
  (a) a mixture comprising an $\alpha$- and/or $\beta$-semihydrate of gypsum; sodium potassium tartrate to reduce expansion and; calcium hydrogen phosphate to promote hardening and capillarity; and
  (b) a modified melamine formaldehyde resin, e.g., a melamine formaldehyde resin having at least one or more amino groups substituted by a sulfite or sulfonic-acid group. Conventional retarders, accelerators and a second hardening agent such as finely-ground anhydrous aluminum sulfate may be present in the mixture. The composition has reduced expansion on setting while having increased strength, lifetime, excellent capillarity and gas permeability.

CROSS REFERENCE TO RELATED APPLICATION

This application is a continuation-in-part of my co-pending application Ser. No. 869,887, filed Oct. 27, 1969, now abandoned, the teachings of which are specifically incorporated by reference herein.

BACKGROUND OF THE INVENTION

The invention concerns a composition for the manufacturers of patterns or molds, particularly molds for making articles which are ordinarily formed in molds of gypsum or a plastics material such as ceramic molds.

In the ceramic and related industries, gypsum-based compositions are used in large quantities for the manufacture of patterns and molds since gypsum possesses a high water absorption capacity.

The gypsum used for the manufacture of ceramic molds is usually a mixture of $\alpha$- and $\beta$-semihydrates. Hard gypsum compositions consisting chiefly of the $\alpha$-semihydrate are used mainly in the brick and tile industry for the manufacture of folded (i.e. ridge, gutter, or trough) tiles. A method is also known by which, to obtain the most dense molds possible, the composition is mixed under vacuum. Hard gypsum compositions are also used in metal foundries for the manufacture of patterns. Molds formed from plasters containing gypsum, are ideal for forming ceramic masses. For example, in the porcelain industry, gypsum batts and molds are used to form ceramic pieces by turning and shaping (jiggering) clay on a potter's wheel, or by pressing the clay thereinto, especially in the manufacture of articles such as plates, because the plaster mold is gas-permeable and can absorb water from the clay slip, and the green clay piece can easily be removed from the final product after drying in the plaster mold.

The plaster mold possesses one principal disadvantage. It has low mechanical strength, so that after a few hundred uses the plaster mold can no longer be used and must be replaced by a new one. It can easily be seen that when plaster molds are used, a large proportion of the operating costs arise from the replacement and/or repair of plaster molds. Such molds also abrade more easily and the capillaries can become plugged with microscopically fine clay particles thus lengthening the time it takes for clay slip to dry in the mold.

Still another disadvantage of plaster is that it tends to expand upon setting. This is a serious problem since the patterns for the molds burst and cannot be reused. Further, the preciseness of the shape of the mold is usually either lost or reduced when the molds burst, and in some cases even when the molds merely swell but do not burst.

Therefore, there have been many attempts to replace the gypsum used in the molds by other materials, but all attempts undertaken in this field, particularly with plastics have failed. It has been generally impossible to produce a replacement material having, to more than a limited extent, the extraordinarily valuable property of gypsum; the porosity and the water absorption capacity of the plaster molds formed therefrom.

SUMMARY OF THE INVENTION

It is among the objects of the present invention to provide a composition for the manufacture of molds or patterns, which is equivalent to the material hitherto used for plaster molds with respect to its desired properties such as capillarity and gas permeability, but which has an appreciably longer life and higher mechanical strength than conventional plaster, and which does not expand upon setting.

Other objects of this invention will be evident from the following description.

According to this invention, there is provided a composition comprising a mixture in which each 100 grams includes from about 0.03 to 0.15 grams of sodium potassium tartrate, from about 2 to 8 grams of calcium hydrogen phosphate, and sufficient $\alpha$- and/or $\beta$-semihydrate of gypsum to complete the 100 grams of mixture, diluted with from about 24–35 mls. of a solution comprising from about 2 to 25 mls. of a 20% aqueous solution of a modified melamine formaldehyde resin or from about 0.2 to 5 grams of a solid modified melamine formaldehyde resin; said modified melamine resin being a conventional melamine formaldehyde resin having at least one amino group substituted by a sulfite or sulfonic acid group. The melamine formaldehyde resin having at least one amino group ventional accelerators, retarders or an additional second hardener may be used.

Preferably about each 24–35 mls. of the diluting solution also comprises from about 0.5 to 1.0 mls. of an aqueous phenol formaldehyde resin or a urea formaldehyde resin solution. Alternatively, a solid phenol formaldehyde resin and/or urea formaldehyde resin may be used. In this alternative, the total amount of resin in the diluting solution should be about 0.2 to 5 grams.

DETAILED DESCRIPTION OF THE INVENTION

As used herein, the terms "retarder," "accelerator" and "hardener" refer to conventional retarding, accelerating and hardening agents known and used by those trained in the plaster and polymer resin art. The exact amounts required are effective amounts as used and recognized by the art and are simply determinable by ordinary techniques in the art. See for example, Plastering Skill and Science, Van den Branden et al., American Technical Society (1953). For sake of clarity, these terms and other terms used in the application are defined as follows:

"Hardener": Hardeners relate to the organic resin portions of the mold composition, not the gypsum, and are substances, in the presence of which, the organic resin in the aqueous medium is carried from intermediate condensation state through the total or final condensation or polymerization. This process is also called "hardening-out." A hardener may also be called a catalyst since it catalyzes the resin to polymerize or condense to a solid state.

According to the present invention, the hardeners must be acidic. Basic compounds are not suitable. For example, calcium hydrogen phosphate, which is used in this invention as both a hardener and functions to improve capillarity, has a pH of about 4.3 and imparts unexpected and improved results to the composition. In contrast diammonium hydrogen phosphate, which has a pH of about 8 is totally unsuitable, and will in fact liberate formaldehyde from the resin.

Exact amounts of the hardener required depend on exact hardness or hardening speeds desired. The amount of hardener that may be used ranges from about 0.01% to 12% by weight of the resin constituent in the mold composition. Particularly preferred are hardener amounts ranging from about 0.05% to 2.5% by weight of the plaster mixture which is mixed with the resin diluting solution.

"Accelerator": Accelerators refer to the gypsums and are substances which accelerate the hydration speed of the semihydrate plaster. Suitable amounts are about 0.1% to 1.5% by weight of the gypsum constituent in the mold.

"Retarder": Retarders also refer to the gypsum, and are substances which delay the hydration speed of the semi-hydrate plaster. Suitable amounts are from 0.001% to 0.12% by weight of the gypsum constituent in the mold. Preferably 0.005% to 0.1% by weight of the plaster mixture to be mixed with the resin diluting solution contains a retarder.

"Urea resin": Resins which are the result of the condensation of urea or thiourea with formaldehyde. These resins are three-dimensional, hardenable, urea-formaldehyde resins, the hardenability of which is due to the presence of free or unsaturated bonds.

"Phenol resin": Resins which are produced by the condensation of phenol with formaldehyde. These are three-dimensional, hardenable, phenol-formaldehyde resins, the hardenability of which results from the presence of free or unsaturated bonds.

"Pore-forming agent": This is an agent which gives the mold composition an increased pore volume, that is, an increase in the permeability of the mold to gas. This may include substances which liberate in the aqueous composition air or gas bubbles. The air or gas bubbles may be distributed in the mold composition by means of carboxymethyl- and methyl-cellulose which act as emulsifiers in the system of gas (air) and water.

The properties of the ceramic compositions to be handled determine the type or mixture of the gypsum to be used. For the manufacture of spun shapes it is preferable to use a mixture, each 100 grams of which comprises β-semihydrate, and from 15 to 40 grams of α-semihydrate, to which are added from 0.05 to 2.5 grams of finely-ground anhydrous aluminum sulfate, $Al_2(SO_4)_3$, as a hardener and from 0.005 to 0.1 gram of "Retardan," or any other conventional retarder or retarding agent ["Retardan" is a trade name for an amino acid based, chloride-free setting retarder manufactured by Badische Anlin & Soda-Fabrik (BASF) and marketed by Chemische Fabrik Grunau GmbH, West Germany; see also Ullmans Encyklopadie der Technischen Chemie, 3rd Edition, vol. 8, p. 122 (1957)]. This compound is similar in performance to "Retarder" manufactured by U.S. Gypsum Company.

The modified melamine resin is a melamine formaldehyde resin having at least one amino group substituted by a sulfite or sulfonic acid group. A preferred melamine resin of this nature is a melamine formaldehyde resin sold under the trade name of "Melment" by Suddeutsches Kalkstickstoffwerk in Trostberg bei Traustein, West Germany. "Melment" is described in British Pat. No. 1,169,-582, the teaching of which is specifically incorporated by reference herein. See also Ullmans Encyklopadie der Technischen Chemie, vol. 3, pp. 487, 489, and U.S. Pat. Nos. 2,211,709 and 2,211,710 for a description of melamine formaldehyde resins. Similarly, Ullmans Encyclopadie der Technischen Chemie, vol. 3, pp. 478–480 describes urea formaldehyde resins.

The use of the modified melamine resin solution alone in the compositions of this invention gives a good result. However, the addition of a phenol formaldehyde resin and/or a urea formaldehyde resin solution appreciably reduces the harmful effects of the water of solution in the compositions to be molded.

The mixtures of the invention are simply prepared by intimate mixing of the individual constituents in the quantities stated.

The sodium potassium tartrate has neither a delaying effect on the hydration of the plaster, nor a hardening effect on the resin. Rather, the sodium potassium tartrate effects a decisive reduction of the setting expansion of plaster. In contrast, compounds such as tartaric acid have no appreciable effect on reducing setting expansion and are inoperative for that function. Preferably, the sodium potassium tartrate is present in a range of from about 0.03% to about 0.15% by weight of the mixture.

Attention should be paid, when preparing the mixture, to ensure that no stored gypsum of either modification is used, i.e., the gypsum used should be fresh and not contain any hyper-stoichiometric water.

Once the mixture has been prepared, however, there is no need to take special precautions to prevent the mixture from absorbing water. In order to retain the desired properties of the mixture despite water absorption, a small quantity of soluble anhydrite (anhydrite III) can be added to the mix. The anhydrite acts in this case as a water adsorbent and prevents the water from having harmful effects on the resin. For this purpose the mol ratio of soluble anhydrite to semi-hydrate gypsum should be in the region of about 1:10. In other words, the semihydrate gypsum used should have no more than about 1 mol soluble anhydrite per 10 mols of semihydrite.

To this mixture there is added the modified melamine formaldehyde resin solution preferably supplied with conventional additives, together with the required quantity of water and the whole is homogenized in an intensive stirring apparatus. The resultant composition is then ready for casting to manufacture ceramic molds. Care should be taken to ensure that the casting composition has a consistency such that it can be poured. After the composition has hardened in the mold, it can be removed.

As can be seen from the above description, the composition of the invention comprises two principal constituents: (a) the mixture, and (b) the diluting solution. Specific, illustrative but non-limiting embodiments of the invention are described below, the principal constituents being designated (A) and (B).

According to a first preferred embodiment of the invention, the composition comprises:

(A) a powdery mixture each 100 grams of which contains:
   (1) from about 0.03 to 0.15 gram of finely-ground potassum sodium tartrate to reduce setting expansion,
   (2) from about 0.05 to 2.0 grams of finely-ground anhydrous aluminum sulfate as a hardener,
   (3) from about 0.005 to 0.1 gram of a conventional retarder, preferably an amino acid based retarder, such as "Retardan," and
   (4) from about 2 to 8 grams of calcium hydrogen phosphate to promote hardening and capillarity, and
   (5) the balance being semihydrate gypsum.

The mixture of powders of A, above, are mixed with:

(B) from about 24 to 35 mils. of solution, comprising:
  (1) from about 2 to 25 mls. of a 20% aqueous solution of a modified melamine formaldehyde resin; or about 0.2 to 5 grams of the melamine resin in solid form;
  (2) from about 0.5 to 1.0 ml. of a phenol formaldehyde resin or urea formaldehyde resin solution, and
  (3) sufficient water to complete the solution.

When solid phenol or urea resins are used, the total amount of resin in this diluting solution is about 0.2 to 5 grams per 24–35 mls. of solution.

According to a second embodiment of the invention, the composition comprises:

(A) a powdery mixture each 100 grams of which contains:
  (1) from about 0.1 to 0.3 gram of p-toluol sulfonic acid,
  (2) from about 0.3 to 0.6 gram of a mixture, consisting of 40 parts of potassium sulfate accelerator and one part of retarder,
  (3) from about 5.0 to 15.0 grams of finely-ground pumice powder, kieselguhr or perlite preferably a perlite having a particle size up to 0.3 mm. such as perlite P.1 and
  (4) the balance being a finely-ground β-semihydrate gypsum.

This mixture A is introduced into (B) 30 mls. of a solution consisting of from about 2 to 15 mls. of a 20% aqueous solution of a modified melamine formaldehyde resin and sufficient water to complete the solution.

These constitutents A and B, as described above, are combined by intimate mixing and are then further worked. The mixture A preferably being present in an amount of about 100 grams per 24–35 mls. of resin diluting solution, is preferably introduced into the melamine formaldehyde resin solution B after the latter has been preheated to about 80° C. to 100° C.

For molds which must have a high permeability to gas, a pore-forming agent, e.g. a powder mixture consisting of a true pore-forming agent and a carboxy methyl cellulose, sometimes a methyl cellulose, may be added. It is important that the pore-forming agent forms an open sponge-like structure, so that a sufficient proportion of the pore-like voids connect with each other and with the surface.

Instead of using the resins in solution as given in B, the resins can also be introduced in solid form, without in any way altering the invention.

When a resin is used in solid, e.g. the granular form, from 0.2 to 5 grams of the modified melamine resin is used per 100 grams of mixture. Instead of using sulfite or sulfonic acid modified melamine resin, another another modified melamine resin can be used, which possesses the properties of the sulfite or sulfonic acid-modified melamine resin.

The additives, pumice powder, kieselguhr or perlite, mentioned in the second embodiment above, can be replaced by a small quantity of an amorphous silicon oxide, e.g. from about 0.3 to 3.0 grams.

Although principally useful for the manufacture of ceramic moulds, the composition in accordance with this invention can also be used with success for the manufacture of other moulds, patterns or pressed pieces, for example in metal casting or in the manufacture of folded tiles (ridge, gutter, etc. tiles) or similar objects.

Experiments comparing conventional ceramic moulds formed only from gypsum with molds manufactured from compositions in accordance with this invention, demonstrate that the compositions of this invention have four times the life of conventional plaster molds, and also possessed the essential properties of good water absorption capacity and good gas permeability.

For example, molds produced according to this invention are permeable to gas without the use of an aerator since the sulfonic acid modified melamine resin does not bring about any capillary closure in the plaster crystal system (i.e. no resinification). The capillaries form normally as in conventional plaster (gypsum) crystal system through the evaporation of the excess water added for the preparation of the plaster. This is a result in part of the presence of calcium hydrogen phosphate and the particular melamine resin utilized. In contrast, other resins or omission of the calcium hydrogen phosphate, result in closed capillaries, and plaster with poor water absorption capacity and poor gas permeability. The composition in accordance with the invention amy be packed, shipped and stored in water and gas-tight bags, or sacks or containers for example, polyethylene sacks.

EXAMPLES

The beneficial importance of the present invention can be further set forth by the following illustrative and comparative examples.

Example 1

Molds were produced utilizing (1) a conventional melamine-formaldehyde resin "Melan 785" manufactured by Henkel & Cie. GmbH Kebstoffwerk, Dusseldorf, West Germany, and (2) the same melamine resin wherein at least one amino group was substituted by a sufite or sulfonic acid group ("Melment"), as illustrated in British Pat. No. 1,169,582, and (3) a conventional urea formaldehyde resin. 3% by weight of each resin was separately admixed with gypsum semihydrate, conventional retarders and hardeners and the resultant mixture placed in a mold. In each instance, the mixture increased its volume by at least 0.4 linear percent so that the mold box burst. However, when the sodium potassium tartrate was used as an additional ingredient, in the resin-gypsum mixture, the final mixture was readily removed from the mold space and expansion was less than 0.2% with the mold box remaining intact. This illustrates the necessity for using sodium potassium tartrate to reduce setting expansion in a mold mixture.

It should be noted that in Biefeld et al., U.S. Pat. No. 2,966,473 wherein only tartaric acid is used, difficulty is encoutered in removing the cured product from the mold space.

Example II

In this example a modified melamine-formaldehyde resin, "Melmet," as illustrated in British Pat. No. 1,169,-582 is compared with an unmodified, conventional melamine-formaldehyde resin. The unmodified resin tested is "Melan 785," manufactured by Henkel & Cie GmbH Kebstoffwerk, Dusseldorf, West Germany. The "Melment" resin has at least one amino group substituted by a sulfite or sulfonic acid group; hence the term "modified." The unmodified resin has no substituted amino groups.

In each test, a predetermined amount of each resin was mixed with a plaster mixture containing 30% α-$CaSO_4,\tfrac{1}{2}H_2O$ and 70% β-$CaSO_4,\tfrac{1}{2}H_2O$ Sodium potassium tartrate in an amount sufficient to limit the linear expansion to less than 0.17% linear was added to the mixture. Calcium hydrogen phosphate, in amounts varying with the amount of resin was also added as a hardener. A conventional retarder or retarding agent was used in an amount to obtain an open time of 30 minutes. In each instance, the plaster bodies formed were dried at 40° C. and, subsequently, the hardness, pore volume and water adsorption measured. The results obtained are presented in Table I.

TABLE

| Resin, percent | NaK tartrate, percent | Retarder, percent | Hardner CaHPO$_4$, percent | Hardness, kg./cm.$^2$ | Pore vol., percent | Water adsorption |
|---|---|---|---|---|---|---|
| "Melment": | | | | | | |
| 0.5 | 0.01 | 0.005 | 0.1 | 930 | 34 | Spontaneous. |
| 1.0 | 0.05 | 0.008 | 0.2 | 1,450 | 24 | Do. |
| 1.5 | 0.07 | 0.012 | 0.3 | 1,600 | 21 | Do. |
| 2.0 | 0.07 | 0.012 | 0.4 | 1,630 | 21 | Slow. |
| 3.0 | 0.07 | 0.012 | 0.6 | 1,610 | 21 | Do. |
| Unmodified melamine-formaldehyde: | | | | | | |
| 0.5 | 0.01 | (¹) | 0.1 | 450 | 41 | Spontaneous. |
| 1.0 | 0.01 | (¹) | 0.2 | 480 | 38 | Retarded. |
| 1.5 | 0.01 | 0.002 | 0.3 | 510 | 38 | Slow. |
| 2.0 | 0.01 | 0.002 | 0.4 | 560 | 36 | Almost zero. |
| 3.0 | 0.02 | 0.005 | 0.6 | 690 | 36 | Zero. |
| 5.0 | 0.03 | 0.007 | 1.0 | 760 | 34 | Do. |
| No resin added | 0.01 | | | 450 | 42 | Spontaneous. |

¹ No retarder necessary.

From the results presented in Table II, it is readily seen that the composition of this invention using a melamine-formaldehyde resin having at least one amino group substituted by a sulfite or sulfonic acid group (modified resin) such as "Melment" is vastly superior to a conventional melamine-formaldehyde resin not containing this substitution (unmodified resin). While each resin improved the hardness of the resultant plaster, the modified resin increased the hardness more than an order of magnitude greater than the unmodified resin. For example, when 1.0% of each resin was prepared in separate plaster moulds, the modified resin composition had a hardness of 1450 kg./cm.$^2$. This is in sharp contrast to the unmodified resin composition which had a hardness of only 480 kg./cm.$^2$. In other words, the unmodified resin increased the hardness of the plaster only about 7% whereas the modified resin increased the hardness of the plaster 217%, thus illustrating the unexpected and improved properties of the composition of this invention.

Just as importantly, the composition of this invention using the modified resin retained the water adsorption properties of the plaster whereas the unmodified resin greatly impaired the water adsorption capabilities of the plaster. This result occurs despite the fact that the plaster containing the unmodified resin has a higher pore volume than the plaster containing the modified resin. Therefore, the unmodified resin is not suited for the intended use of the modified resin; namely, to increase hardness and retain water adsorption qualities. The same results are obtained when a urea formaldehyde resin is substituted for the unmodified melamine-formaldehyde resin further illustrating the unique properties of the modified melamine-formaldehyde resin.

I claim as my invention:

1. A composition of matter for use in the manufacture of pattern and ceramic molds which comprises:
    (A) a mixture comprising:
        (1) an α- or β-semihydrate of gypsum, or a mixture thereof, having no more than about 1 mol soluble anhydride per 10 mols of semihydrate,
        (2) sodium potassium tartrate, to reduce expansion upon setting,
        (3) calcium hydrogen phosphate, to promote hardened and capilliarity, and
    (B) a melamine formaldehyde resin having at least one amino group substituted by a sulfite or sulfonic acid group or an aqueous solution thereof,
said composition having reduced expansion upon setting, while having at the same time increased strength, lifetime, excellent capillarity, and gas permeability.

2. A composition according to claim 1 wherein:
said mixture (A) contains:
    about 0.03% to 0.15% by weight sodium potassium tartrate,
    about 2% to 8% by weight calcium hydrogen phosphate as a hardener,
    the balance being an α- or β-semihydrate of gypsum or a mixture thereof,
and said component (B) being:
    an aqueous solution of said sulfite or sulfonic acid group substituted melamine-formaldehyde resin, each 24–35 mls. of said solution containing about 2 to 25 mls. of a 20% aqueous solution of said resin.

3. A composition of matter for use in the manufacture of ceramic molds which comprises:
    (A) a mixture comprising:
        (1) about 0.03% to 0.15% by weight sodium potassium tartrate to reduce expansion upon setting,
        (2) about 2% to 8% by weight calcium hydrogen phosphate to promote hardening and capilarity,
        (3) the balance being an α- or β-semihydrate of gypsum, or a mixture thereof, and
    (B) an aqueous diluting solution of a melamine-formaldehyde resin having at least one amino group substituted by a sulfite or sulfonic acid group, each 24–35 mls. of said solution containing about 2–25 mls. of a 20% aqueous solution of said resin or about 0.2 to 5 gms. of said melamine-formaldehyde resin in solid form,
said mixture (A) being present in said composition in an amount of about 100 gms. per 24–35 mls. of said diluting solution.

4. A composition according to claim 3 wherein each 24–35 mls. of said diluting solution also comprises from 0.5 to 1.0 ml. of an aqueous solution of phenol formaldehyde resin or an urea formaldehyde resin.

5. A composition according to claim 3 wherein about 15% to 40% of the gypsum semihydrate is α-semihydrate.

6. A composition of claim 3 also containing a conventional additive selected from an accelerator, a retarder, or mixture thereof.

7. A composition according to claim 6 wherein said mixture contains from about 0.005% to 0.1% by weight of a conventional amino acid based, chloride free setting retarder as said second retarder.

8. A composition according to claim 3 wherein said mixture contains from about 0.005% to 0.1% by weight of a conventional amino acid based, chloride free setting retarder as a second retarder.

9. A composition according to claim 3 further comprising a conventional pore forming agent and carboxy methyl cellulose or methyl cellulose.

10. A composition according to claim 3 wherein said mixture comprises from about 0.1% to 0.3% by weight p-toluene-sulfonic acid, from about 0.3% to 0.6% by weight of a mixture comprising about 40 parts potassium sulfate, about 1 part of a conventional amino acid based, chloride free setting retarder and about 5% to 15% by weight of finely-ground pumice powder, kieselghur or perlite.

11. A composition according to claim 3 wherein said mixture comprises from about 0.1% to 0.3% by weight p-toluene-sulfonic acid, from about 0.3% to 0.6% by weight of a mixture comprising about 40 parts potassium sulfate, about 1 part of a conventional amino acid based, chloride free setting retarder and from about 0.3% to 3% by weight of an amorphous silica.

12. A composition according to claim 3 wherein said mixture also comprises a soluble anhydrite.

13. A composition according to claim 3 wherein said diluting solution also comprises a solid resin which is a phenol formaldehyde resin or a urea formaldehyde resin, the total amount of resin in the diluting solution being from about 0.2 to 5 grams per 24–35 mls. of said diluting solution.

References Cited

UNITED STATES PATENTS

| | | | |
|---|---|---|---|
| 2,494,403 | 1/1950 | Nies et al. | 106—38.35 |
| 2,754,220 | 7/1956 | Gardner | 106—38.3 |
| 2,863,842 | 12/1958 | Bonzaghi | 260—29.4 |
| 2,931,733 | 4/1960 | Covert et al. | 106—91 |
| 2,966,473 | 12/1960 | Biefield et al. | 260—29.4 |
| 2,970,127 | 1/1961 | Slayter et al. | 260—38 |
| 2,987,789 | 6/1961 | Moren | 22—193 |
| 2,993,016 | 7/1961 | Sucetti | 260—15 |
| 3,083,110 | 3/1963 | Preston | 106—38.35 |

WILLIAM H. SHORT, Primary Examiner

E. A. NIELSEN, Assistant Examiner

U.S. Cl. X.R.

106—38.35; 260—13, 29.4 R